(12) United States Patent
Aurich

(10) Patent No.: US 8,348,146 B1
(45) Date of Patent: Jan. 8, 2013

(54) SYSTEM AND METHOD FOR DETERMINING PRODUCT AUTHENTICITY

(76) Inventor: Cristhian Javier Quintanilla Aurich, Miami, FL (US)

( * ) Notice: Subject to any disclaimer, the term of this patent is extended or adjusted under 35 U.S.C. 154(b) by 182 days.

(21) Appl. No.: 12/781,503

(22) Filed: May 17, 2010

(51) Int. Cl.
*G06F 17/00* (2006.01)

(52) U.S. Cl. .................. 235/375; 235/454; 235/462.01; 235/487

(58) Field of Classification Search .............. 235/375, 235/383, 385, 454, 462.01, 462.13, 462.45, 235/472, 1, 487, 494
See application file for complete search history.

(56) References Cited

U.S. PATENT DOCUMENTS

| | | | | |
|---|---|---|---|---|
| 6,069,955 | A * | 5/2000 | Coppersmith et al. | 380/54 |
| 6,226,619 | B1 * | 5/2001 | Halperin et al. | 705/23 |
| 6,421,234 | B1 * | 7/2002 | Ricks et al. | 361/679.56 |
| 6,442,276 | B1 * | 8/2002 | Doljack | 380/51 |
| 6,614,392 | B2 * | 9/2003 | Howard | 342/357.31 |
| 6,652,455 | B1 * | 11/2003 | Kocher | 600/300 |
| 7,089,420 | B1 * | 8/2006 | Durst et al. | 713/176 |
| 7,162,035 | B1 * | 1/2007 | Durst et al. | 380/54 |
| 7,264,169 | B2 * | 9/2007 | Juds | 235/468 |
| 7,283,630 | B1 * | 10/2007 | Doljack | 380/55 |
| 7,309,011 | B2 | 12/2007 | He | |
| 7,322,514 | B2 * | 1/2008 | Lubow | 235/375 |
| 7,334,729 | B2 * | 2/2008 | Brewington | 235/383 |
| 7,358,857 | B1 * | 4/2008 | White | 340/572.8 |
| 7,364,074 | B2 | 4/2008 | He et al. | |
| 7,387,249 | B2 * | 6/2008 | Hudson et al. | 235/462.01 |
| 7,537,157 | B2 | 5/2009 | Silverbrook et al. | |
| 7,543,745 | B1 | 6/2009 | Simske et al. | |
| 7,571,856 | B2 * | 8/2009 | Lo | 235/462.01 |
| 7,686,231 | B2 * | 3/2010 | Hamilton | 235/494 |
| 7,992,772 | B2 * | 8/2011 | Grant et al. | 235/375 |
| 7,996,319 | B2 * | 8/2011 | Dillon | 705/50 |
| 2003/0141358 | A1 * | 7/2003 | Hudson et al. | 235/375 |
| 2003/0210805 | A1 | 11/2003 | Lofgren et al. | |
| 2005/0199723 | A1 * | 9/2005 | Lubow | 235/462.01 |
| 2008/0022098 | A1 * | 1/2008 | Muscat et al. | 713/168 |

\* cited by examiner

*Primary Examiner* — Daniel Hess
*Assistant Examiner* — Paultep Savusdiphol
(74) *Attorney, Agent, or Firm* — Malloy & Malloy, P.L.

(57) ABSTRACT

The system and method for determining product authenticity including a code assembly having a plurality of preferably three displayed companion codes visually observable on the product and purportedly associated therewith. A communication device is structured to input at least one of the displayed companion codes and transmitted to a remote processor facility. A database accessible by the processor facility includes a plurality of preferably three correct companion codes correctly associated with the product wherein receipt of the displayed companion codes from the communication device will facilitate access by the processor facility of the database and the plurality of correct companion codes associated with the product, wherein product authenticity is determined by a transmission of a predetermined one of the displayed companion codes back to the communication device for comparison with the one other of the displayed companion codes not transmitted to the processor facility.

23 Claims, 3 Drawing Sheets

SYSTEM AND METHOD FOR DETERMINING PRODUCT AUTHENTICITY

BACKGROUND OF THE INVENTION

1. Field of the Invention

The present invention is directed to a system and method for establishing product authenticity of any of a variety of different products, which are available for review by a customer prior to use or purchase. Product authenticity is determined by comparison of a plurality of displayed companion codes, observable on the product or on or within the product packaging, with a plurality of correct companion codes, the latter accurately identifying the product and being maintained at a remote processor facility. Code comparison may be performed by a customer before or after purchase or by different entities along the distribution chain of the product.

2. Description of the Related Art

Counterfeit products are all too often presented to the consuming public in a manner which is sufficiently effective to easily mislead consumers into believing that the product of interest is authentic. As such, the packaging, labeling as well as the appearance or structural features of the product itself may closely resemble or at least initially appear to be identical to that of an authentic product.

In order to overcome the proliferation of counterfeit products, the manufacturers, distributors, retailers, etc. of authentic products attempt to prevent entry of the counterfeit products into the marketplace. This is sometimes accomplished by providing some type of identifying feature or characteristic to the product or its labeling. Because of the large potential profit in the distribution of counterfeit products, those involved in such practice have become skilled in duplicating not only the labeling and packaging, as set forth above, but also the aforementioned "product identifiers" associated with the authentic product. As a result, the determination of product authenticity is made increasingly more difficult. Further, such product identifiers are generally disposed or structured for the benefit of the retailer, wholesaler, distributor, etc. of such products, rather than the consumer. Therefore, while the elimination of counterfeit products along the distribution chain is important, consumers are typically excluded from the knowledge or use of such identifiers. As a result, in situations where the recognition of counterfeit products has failed, prior to reaching the consumer, known authenticating systems and techniques which allow the consumer to independently determine product authenticity are generally unavailable.

By way of example only, the retailer, wholesaler, distributor or other entity may have expensive or complicated equipment to scan or otherwise determine the authenticity of the product labeling, packaging, etc. However, the average consumer entering a store or other market place does not have the benefit of such investigative equipment, due at least in part to the cost and/or inconvenience in carry or using such equipment. Accordingly, current counterfeiting techniques have become sophisticated to the point that the average consumer must rely on distributing entities to establish product authenticity, once the product is on the shelf.

Due to the existence of problems of the type set forth above, there is a need in the industries associated with product sales and distribution for an authenticating system and method, which may be utilized by the average consumer, as well as the distribution entities for any number of products. Such an improved system and method should be capable of efficiently establishing product authenticity preferably before but also after purchase. In addition, such a preferred system and method should be reliable in authenticating any of a large number of products especially including, but not limited to, those over-the-counter products which are consumable such as pharmaceuticals, food and beverages, etc. Therefore, the application of such an authenticating system and method should not be limited to a specific category or line of products, but rather be adaptable for a variety of different products.

Further, at least one aspect of a proposed and improved system and method of product authenticity should be capable of being accomplished utilizing ubiquitous type communication devices such as, but not limited to, a mobile, hand-held device having wireless communication capabilities and further being adaptable for the input of various applications which render it even more effective. The capabilities of such a common communication device should be capable of establishing bidirectional communication between a customer and a processor facility, which is associated with a database of correct companion codes which accurately identify a product in question. Moreover, such a proposed system and method should also involve the inclusion of a code assembly comprising a plurality of displayed companion codes visually accessible on the product and purportedly accurately identifying the product.

Finally, the determination of product authenticity can be reliably established by a matching comparison, utilizing wireless bidirectional communication, of correct companion code data with displayed companion code data, by the consumer.

SUMMARY OF THE INVENTION

The present invention is directed to a system and method for determining product authenticity comprising the inclusion of a code assembly in the form of a plurality of "displayed" companion codes disposed in a visually accessible location on the product of concern. As such, the code assembly may be disposed on the label, inside or outside the packaging and/or on portions of the product itself, depending at least in part on the category of products being authenticated.

Further, the system and method of the present invention may be described in detail hereinafter with regard to a specific product such as, but not limited to, a pharmaceutical or other consumable product. However, the versatility and adaptability of the present system and method facilitate its practice on a variety of different product categories including, but not limited to, consumable products and non-consumable products, as well as an almost unlimited number of products, where the aforementioned displayed companion code assembly can be visually accessed prior to purchase, use, consumption, etc., of the product.

Further, as used herein, the term "companion" in association with the plurality of codes is indicative of the interaction of the plurality of displayed companion codes as well as a plurality of correct companion codes, as will be described in greater detail hereinafter. Such interactive companionship between the "display companion codes" and "correct companion codes" assures simplicity, efficiency and overall accuracy in determining product authenticity. Moreover, the term product authenticity is used in a broad sense and includes not only the determination of whether or not the product is counterfeit, but also the existence of other factors relating to the product, which would directly interest an individual prior to or after the product's purchase, use, etc. More specifically, the system and method of the present invention is operative to inform an individual as to whether the product has been recalled, is outside an expiration date for purchase or use or otherwise associated with a condition(s) that the consumer should be made aware prior to purchase.

Accordingly, the system and method of the present invention comprises the displayed companion code assembly including a plurality of preferably three displayed companion codes. Moreover, each of the displayed companion codes is purportedly associated with the product, due primarily to the fact that they are visually accessible on the product or its labeling, packaging, etc. and thereby assumed to accurately identify the product.

In addition, a processor facility is located remotely from the product location and is structured to accomplish bidirectional communication with any of a number of ubiquitous type personal communication devices accompanying or accessible by the customer. Such communication devices can include, but not be limited to, cell phones, PDA devices or other modern communication devices capable of wireless communication over one or more communication networks. In at least one embodiment, communication between the consumer and the processor facility may be accomplished over the Internet, a cellular communication network or a variety of other appropriate networks, wherein data can be directed between a given communication device and the processor facility on a selective and/or bidirectional basis. In addition to establishing communication with a customer, the present invention also includes the ability to determine product authenticity at various points along the distribution chain including from the manufacturer to the final retailer/distributor, as will be explained in greater detail hereinafter.

The processor facility is directly associated with or otherwise has access to a product database which contains a plurality of preferably three "correct" companion codes which accurately or correctly identify the product in question. As set forth above, the term "companion" when describing either the displayed companion codes or the correct companion codes emphasizes the interaction of such codes during a comparison thereof, utilizing wireless or other appropriate communication between the customer and a processor facility. More specifically, an accurate match between predetermined ones of the correct companion codes and the displayed companion codes indicates that the displayed companion codes appearing on the product serve to identify the product as being genuine. In contrast, a non-match of predetermined ones of the correct companion codes and the displayed companion codes is indicative that the product is counterfeit or possibly subject to other conditions. As set forth above, the customer may be informed of other conditions of the product such as, but not limited to, product recall, expiration date, etc., by making the comparison of predetermined ones of the codes.

More specifically and as utilized, a customer may enter a retail establishment, market place, distribution area, etc. where any number of products are on display for purchase, consumption, etc. In order to establish authenticity, the customer or any individual accesses the displayed companion code assembly comprising the plurality of displayed companion codes and inputs a predetermined one of such displayed companion codes into his or her communication device. This inputted code is then transmitted to the aforementioned processor facility where it is evaluated, at least in terms of recognizing that it is associated with a given product. Such evaluation and recognition allows the processor facility to access the aforementioned database and more specifically the correct companion code assembly comprising the plurality of correct companion codes which are accurately associated with or identify the product being reviewed by the customer.

By way of example only, the customer may transmit a first of the plurality of displayed companion codes to the processor facility, wherein this first transmitted displayed companion code is "structured" to identify the product being reviewed. In turn, the processor facility will recognize the displayed "identifying" code transmitted by the customer and use it to locate the appropriate correct companion code assembly accurately associated with the product being reviewed. Such recognition will be based on the fact that the identifying capabilities of the transmitted first displayed code will accurately "inform" the processor facility and allow the processing capabilities associated therewith to identify the product in question. As such, the first transmitted "identifying" displayed companion code may also be the same as the first or corresponding correct companion code associated with product in question and stored in the database, etc. of the processor facility.

Once the processor facility properly identifies the product in question and locates the associated correct companion code assembly associated with the product, it selects one of the plurality of correct companion codes, such as the third correct companion code, which specifically differs from first displayed or "identifying" companion code, which was initially transmitted by the customer to the processor facility. This third correct companion code is then transmitted back to the consumer, where it is visually or audibly accessible on that consumer's communication device. The received third correct companion code is then compared, by the consumer with a corresponding third one of the displayed companion codes. If such compared codes "match", the product is thereby authenticated.

Further, appropriate software associated with manufacture, packaging, labeling, etc. of a given product assures that each product included in the practice of the system and method of the present invention includes a unique correct code assembly comprising a combination of preferably three correct companion codes, which will be securely maintained in the aforementioned database. As a result, an authentic product will have a unique combination of the plurality of displayed companion codes appearing thereon and each product incorporated within practice of the present invention will have a different combination of displayed companion codes. Any attempt to counterfeit a given product, such as by making up the displayed companion codes which may be similar to the displayed companion codes of an "authentic" product onto a counterfeit product will be detected by a failure of the compared codes to match. As a result, a consumer transmitting any one of the displayed companion codes appearing on a counterfeit product will result in the processor facility failing to identify the product (wrong first "identifying" code transmitted to the processor facility). Alternatively, the processor facility may recognize the identifying code from the counterfeit product, access the correct companion codes of an authentic product and transmit one of such accessed correct companion codes back to the communication device of the consumer. However, the code received by the customer will not match the remaining code(s) displayed on the counterfeit product. Such a non-matching comparison will result in the consumer determining that the product is in fact counterfeit. Further by way of example, the copying of the codes from an authentic product onto a counterfeit product and the transmission thereof to the processor facility will indicate the product represented by such code has been previously recognized or that the code was transmitted from a location not associated with the correct or intended location of the authentic product. As a result the customer will be informed of such a discrepancy and the possibility of the product being a counterfeit. Accordingly, each plurality of correct companion codes maintained in the database are representative of only a single product regardless if that product is common to a category of other products.

Moreover, the format of each of the plurality of displayed companion codes and each of the plurality of correct companion codes is different, in order to enable an extremely large number, combinations of codes to be used on an extremely large number of individual products. More specifically, the first, second and third displayed companion codes and the first, second and third correct companion codes may respectively comprise an alpha/numeric format, an optical scanning format and an icon format.

Other operative and structural features of the system and method of the present invention include the processor facility being structured to transmit to the communication device of the consumer not only a predetermined one of the correct companion codes, but also "associated media" such as, but not limited to, a web page. In such an additional embodiment, the correct companion code transmitted back to the consumer will be embedded or otherwise readily accessible by viewing and accessing the transmitted web page. Obviously, additional media formats, such as a video file, audio file, etc., may define the transmitted associated media. While the communication between the customer and the processor facility is primarily described herein as being by wireless communication over the Internet, other means of communication can be used such as contact by telephone communication with an operator (800 number), interactive voice response system (IVR) and/or by short message service (SMS), etc., all of which may be maintained by the processor facility.

Accordingly, the system and method of the present invention overcomes many of the problems associated with the distribution, sale or, marketing of products by providing for the efficient determination of product authenticity in a manner which also informs the consumer of other conditions of which he/she should be made aware prior to purchase or use.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

As shown in the accompanying Figures, the present invention is directed to a system and method, schematically represented as 10, for authenticating any of a plurality of different products. As used herein, "product authenticity" can include the determination as to whether or not the product is counterfeit. In addition this term may be used herein as an indication that the consumer may be informed of other product conditions such as the product being subjected to a recall for any of a variety of reasons; the product being outside a time period for use or consumption, etc. Further, while the system and method 10 of the present invention will be described in detail with reference to a single product, it is emphasized that the versatility of the system and method 10 is such as to be readily adapted for the authentication of a plurality of products, wherein the products may vary in type and category and include, but not be limited to, products which are intended for use or consumption.

Figure 1:
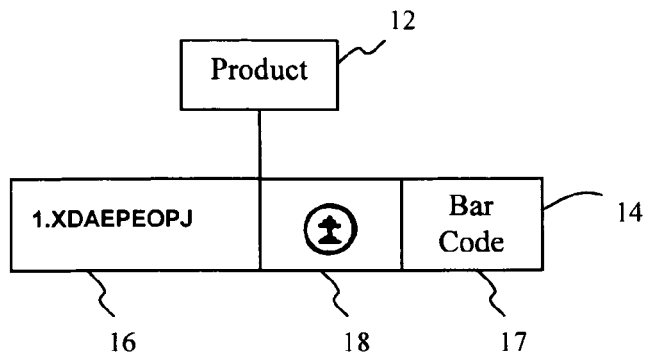
FIG. 1 is a schematic representation in block diagram form of one of a possible plurality of products to be authenticated.
Figure 2:
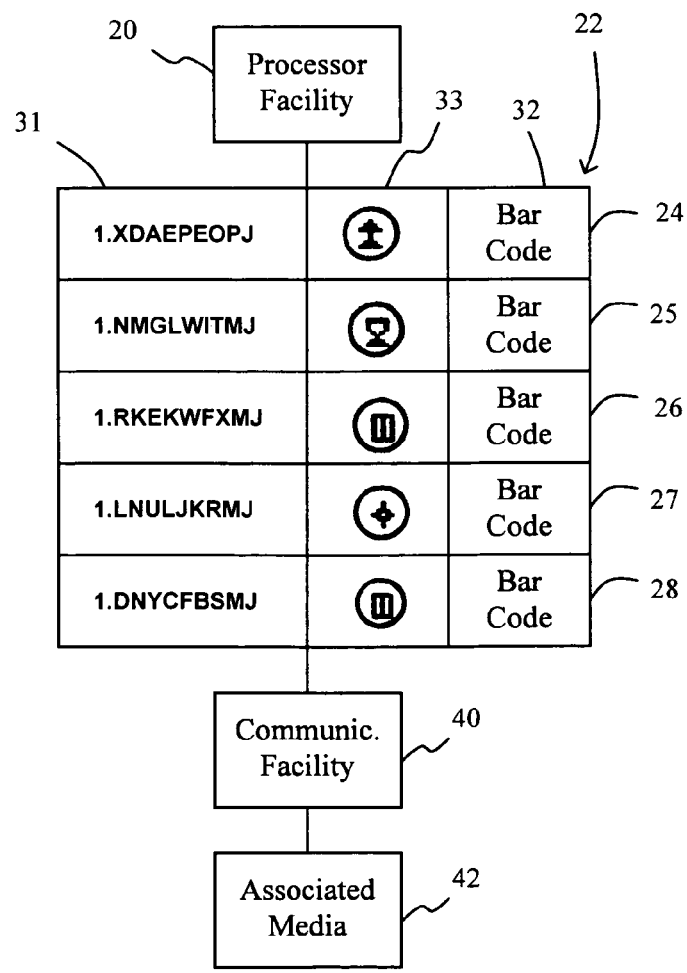
FIG. 2 is a schematic representation in block diagram form of a processor facility and associated database structured for bidirectional communication with a communication device of the embodiment of FIG. 3.

With primary reference to FIGS. 1 and 2, the product 12 comprises a displayed companion code assembly 14 which includes a plurality of at least two displayed companion codes, but preferably three displayed companion codes 16, 17, and 18. For reasons to be described in greater detail hereinafter, each of the plurality of displayed companion codes 16, 17 and 18 are represented in a different format. More specifically, a first displayed companion code 16 comprises an alpha/numeric format, a second of the plurality of displayed companion codes 17 associated with the product 12 includes a structure or presentation which may be optically scanned. A third of the plurality of displayed companion codes 18 preferably comprises an icon format as indicated. Further, each of the plurality of displayed companion codes is disposed in a visually accessible location on the product, including being located on the product labeling and/or on the interior or exterior of the product packaging, etc. As such, the displayed companion code assembly 14 including the plurality of displayed companion codes 16, 17 and 18 are disposed on the product in a manner which purportedly identifies the product as being authentic.

As a result, the plurality of displayed companion codes are utilized to establish authenticity by a selective and predetermined comparison with a corresponding plurality of correct companion codes which accurately identify an authentic product 12. Accordingly, a processor facility 20 is located remote from the product 12 and the individual or customer interested in obtaining the product 12. In addition, the processor facility 20 maintains or has access to appropriate processor capabilities, including database 22. In that the system and method 10 of the present invention is designed to authenticate a large number of different products, such as at 12, the database 22 includes a number of correct companion code assemblies 24, 25, 26, 27, 28, etc. each being unique to a different, specific product. Further, each of the correct companion code assemblies 24-28 include a plurality of at least two, but preferably three correct companion codes 31, 32 and 33. Similar to the plurality of displayed companion codes 16-18 accessible on the product 12, each of the plurality of correct companion codes 31, 32 and 33 of each of the correct companion code assemblies 24-28 also include a different format which corresponds to the indicated format of the displayed companion codes 16, 17, 18, etc. As forth above, each of the different correct companion code assemblies 24-28 are associated with or are structured to accurately identify a different product, wherein a specific or predetermined one of the correct companion code assemblies, as at 24, is associated with and accurately identifies the product 12 being authenticated, as represented in FIG. 1.

Further, as used herein, the term "companion" used herein in association with the plurality of displayed codes 16-18 and the plurality of correct codes defining each of the correct code assemblies 24-28 is indicative of the interaction of the plurality of displayed codes as well as a plurality of correct codes. Such interactive companionship between the "display companion codes" and "correct companion codes" assures simplicity, efficiency and overall accuracy in determining product authenticity. Moreover, the term "companion" when used in describing either the displayed companion codes or the correct companion codes emphasizes the interaction of such codes during a comparison there between. More specifically, an accurate match between predetermined ones of the correct codes and corresponding ones of the displayed codes indicates that the displayed companion codes appearing on the product in fact identifies the product as being genuine. In contrast, a comparison resulting in a non-match is indicative that the product is counterfeit. As set forth above, once the product 12 being reviewed is recognized by the processor facility 20, the customer attempting to determine authenticity may also be informed of other conditions of the product, such as product recall, expiration date, etc.

Figure 3:
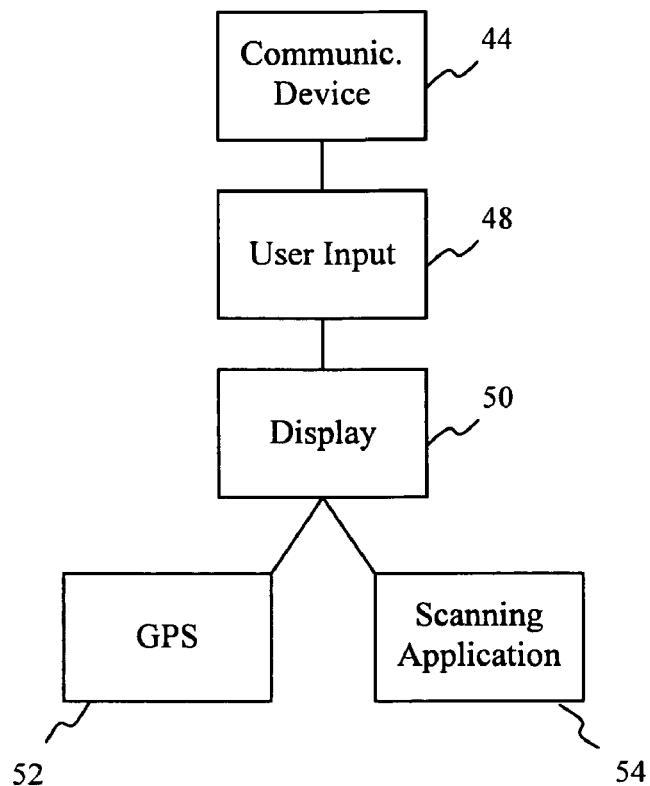
FIG. 3 is a schematic representation in block diagram form of a communication device in the possession of and/or operative by a customer or other individual interested in product authentication.
Figure 5:
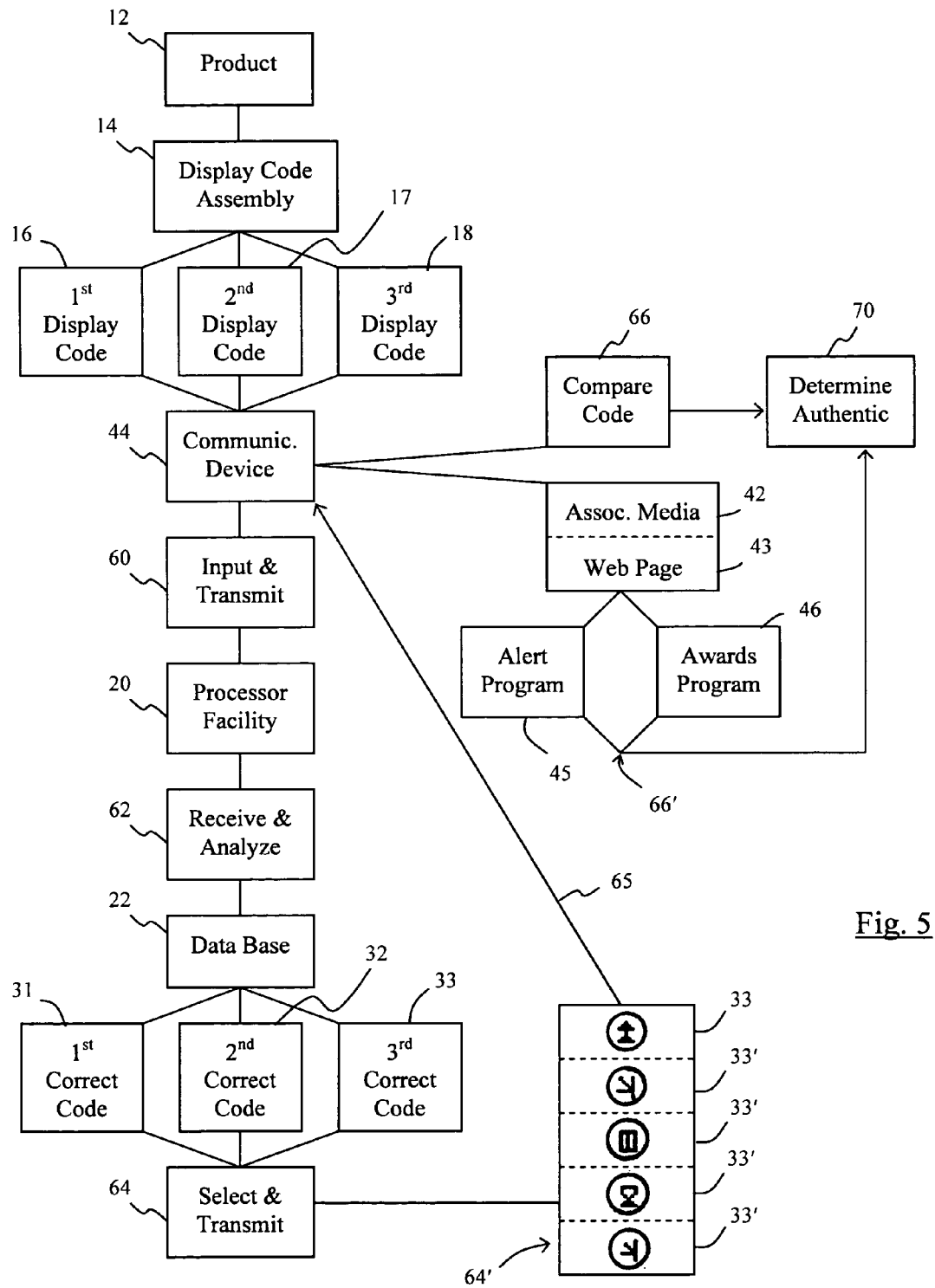
FIG. 5 is a schematic representation in block diagram form of one preferred embodiment of the system and method of the present invention facilitating the accurate, reliable and efficient authentication of a product incorporating the features of the embodiments of FIGS. 1-4.

In addition, the processor facility 20 includes a communication facility 40 capable of bidirectional communication with a communication device 44, as schematically represented in FIGS. 3 and 5. Further, the communication facility 40 is operative to transmit predetermined correct companion codes associated with a corresponding correct code assembly 24-28 to the communication device 44 for purposes of comparison. As further represented in FIG. 2, the communication facility 40, in cooperation with the processor facility 20, is also operatively structured to transmit and/or generate predetermined "associated media" 42 to the communication device 44, wherein the associated media 42 may include the predetermined, correct companion code to the communication device 44.

Figure 4:
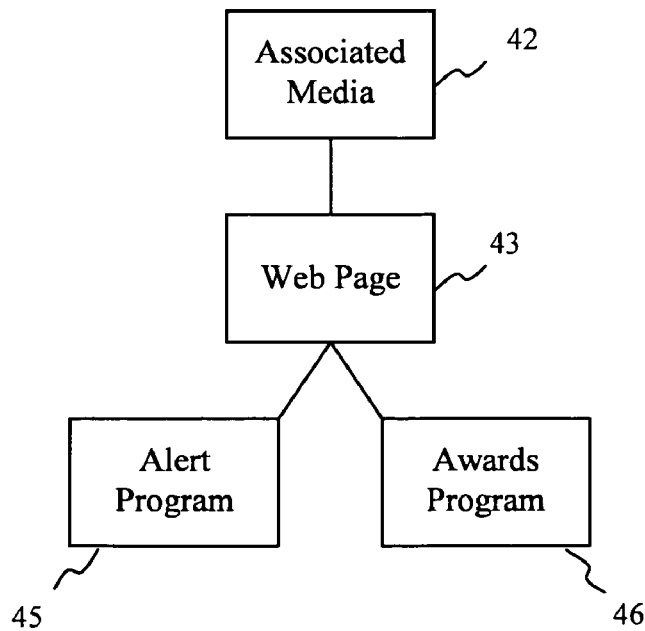
FIG. 4 is a schematic representation in block diagram form of structural and operative details associated with the processor facility of the embodiment of FIG. 2.

With primary reference to FIG. 4, the associated media 42 transmitted by the communication facility 40 may be in the form of a webpage 43 or other video or audio files. As such, the webpage 43 may be directly associated with the product 12 or company associated therewith and as such, may include a plurality of advertisements, informational data, displays, etc. In addition, the associated media 42, such as when it is in the form of the webpage 43, may include an alert program 45 and/or an awards program 46. The alert program 45 is structured to warn a potential consumer or other individual as to related conditions associated with the product 12 such as, but not limited to, whether the product has been recalled, time expiration data, etc. as set forth above. The awards program 46 may be used as a part of the advertising data also contained within the webpage 43 and may provide awards, benefits, coupons, etc. to a customer or individual attempting to authenticate a product 12. As a result, the awards program 46 may facilitate an increased use of the authenticating system and method 10 of the present invention.

Further with regard to FIG. 3, at least one preferred embodiment of the present invention includes the communication device 44 preferably being in the form of a hand-held, mobile device capable of wireless communication such as, but not limited to, a cell phone, PDA, or like communication facility. The communication device 44 includes a user input 48 which may be any appropriate user interface such as a keyboard, touch screen, audio input, etc. In addition, the communication device preferably includes a display 50 which allows for video and/or audio presentation to the customer for individual evaluating the product 12. The display facility 50 allows for viewing of the webpage 43 or other forms of the associated media 42. Yet another structural and operative feature of the communication device 44 is the inclusion of GPS capabilities, as at 52. As such the communication device 44 and the customer or individual operatively associated therewith will serve to communicate to the processor facility 20 the location of the product 12, it being assumed that the communication device 44 is being used to practice the authenticating system and method 10 of the present invention to accomplish effective authentication of the product 12.

The communication device 44 may also be structured to include or be used with an appropriate scanning application 54, which may have the ability to optically or otherwise scan an appropriate one of the plurality of displayed companion codes, as at 17. By way of example the second displayed companion code 17 and the second correct companion code 33 of each of the correct companion code assemblies 24-28 may include a format, such as a bar code, which is structured to be optically scanned.

With primary reference to FIG. 5, the authenticating system and method 10 is schematically represented and described herein in terms of authenticating a single product 12. However, it is again emphasized that the system and method 10 of the present invention is intended for use in the authenticating of a large number of products, which may differ in types, categories, etc. Accordingly, as practically applied, the product 12 is assigned a single, displayed companion code assembly 14 which is unique to that product and which includes a plurality of at least two, but preferably at least three displayed companion codes 16, 17 and 18. As also set forth above, each of the displayed companion codes 16-18 are presented on the product 12 in a different format including, but not limited to an alpha/numeric format representative of the first displayed companion code 16; a displayed companion code 17 which is structured for optical scanning, such as a bar code; and a third displayed companion code 18 which may comprise an icon format.

Once accessing or determining the location of the displayed companion code assembly 14, a customer, through operation of the communication device 44, inputs a selected "identifying" code, which may be defined by one of either the first or second displayed companion codes 16 or 17. By way of example, if the customer or individual selects to transmit the first displayed companion code 16, comprising an alpha/numeric format, as the identifying displayed code, the input thereof, as at 60 may be accomplished using a manual input such as the aforementioned keyboard, touch screen, etc. However, the customer or individual attempting to authenticate the product 12 may otherwise decide to use a second of the plurality of displayed companion codes 17 as the first transmitted identifying displayed code. In this case, displayed companion code 17 is structured for optical or other appropriate scanning techniques. Assuming that the communication device 44 includes an appropriate scanning application 54, the barcode or other type second displayed companion code 17 is scanned and thereby transmitted to the processor facility 20, for purposes of identifying the corresponding product 12 and more specifically the correct companion code assembly 24 associated therewith.

The first transmitted identifying displayed companion code 16 or 17 is received by the processor facility 20 and analyzed as at 62. Based on the transmitted code 16 or 17 being "structured" to include appropriate identifying capabilities it will be recognized, utilizing appropriate processor capabilities associated with the processor facility 20. As a result the database 22 will be accessed and an appropriate, corresponding correct code assembly 24, associated with the product 12, will be identified. Such identification of the proper correct companion code 24 is accomplished by matching the transmitted identifying code, such as the first displayed companion code 16, with the corresponding stored correct companion code 31. A similar comparison and analysis would result if the second displayed companion code 17 was first transmitted as the identifying code by the communication device 44. However, the transmission by the communication device 44 and subsequent recognition of the second companion code 17 by the processor facility 20, by it corresponding to the second correct companion code 32, may be accomplished using appropriate scanning techniques. In either event, the processor facility 20 will recognize that the appropriate correct code assembly 24 is at least tentatively associated with the product 12 being authenticated.

As a result, the processor facility 20 will then select a third correct companion code 33, from the identified correct companion code assembly 24 unique to the product 12, and transmit it back to the communication device 44. Once received by the communication device 44, the third correct companion code 33, preferably having the icon format, will be compared the third displayed companion code 18 having the common icon format. More specifically, product authenticity is determined by a comparison of the one correct companion code 33, transmitted by the processor facility 20 back to the communication device 44 with the correspondingly formatted displayed companion code 18. However, in order to accomplish an accurate and reliable comparison, the third correct companion code 33, transmitted back to the communication device 44, will preferably differ in format, such as the icon format, from format of the identifying first or second code 16 or 17 which was originally transmitted to the processor facility 20 by the communication device 44, for the purpose pf identifying the product 12 and the corresponding correct companion code assembly 24.

In other words, the communication device 44 can initially transmit either the first displayed companion code 16 or the second displayed companion code 17 as the "identifying" code. Once received, as at 62, the processor facility 20 accesses the database and more specifically finds the correct "identifying" companion code as at 31 or 32, corresponding to the first transmitted "identifying" companion code 16 or 17. If the identifying code 16 or 17 transmitted from the communication device 44 to the processor facility 20 matches the corresponding identifying correct code 31 or 32, the processor facility then activates the communication facility 44 and transmits back to the communication device 44, a third one of the correct companion codes 33, which differs from the identifying code 16 or 17 as at 64 and 65 schematically represented in FIG. 5. Once the correct companion code 33 is received at the communication device 44, a comparison is made of the received code, as at 66 by the individual, utilizing a visual comparison of the correct icon code 33 with the displayed icon code 18. If such comparison results in a match, it is determined that the product 12 is authentic, as at 70. If the icon codes 33 and 18 do not match, the product is not authentic. As also set forth above, if the above noted comparison results is a match, then the customer may be assured that the product is authentic. In addition and as also set forth above, additional messages or data may be communicated to the customer and more specifically to the communication device 44 such as the product conditions including product recall, expiration date, etc.

With further reference to FIG. 5, yet another preferred embodiment of the present invention is schematically represented. More specifically, in one preferred embodiment the third correct companion code 33 corresponding to the product 12 and the accurate correct code assembly 24 is transmitted to the customer, as at 65. However, in another preferred embodiment, an array of transmitted codes, generally indicated as 64', may be transmitted, as at 65 to the communication device 44. In this embodiment, the array of codes 64' comprises a plurality of incorrect codes, each designated as 33', along with the accurate, correct companion code 33. The user operating the communication device 44 will then inspect the transmitted array of codes 64' to determine if at least one of the plurality of codes 33, 33' defining the array 64' matches the corresponding third displayed code 18. If a correct match exists, the customer will be assured that the product 12 is authentic. As also noted the incorrect codes 33' and the correct companion code 33 are all the same format such as, but not limited to, the icon format.

As set forth above, the processor facility 20 is also capable of generating associated media 42, such as in the form of a webpage 43. As a result, the webpage 43 or other forms of the associated media 42 will include the selected and transmitted third correct companion code 33, which may be transmitted singularly or as part of the array of codes 64', to facilitate the comparison 66, as set forth above. In addition and as also set forth above, the webpage 43 may also include the aforementioned alert program 45 which indicates other terms or conditions of authenticity of the product 12. Also the webpage 43 may include the awards program 46 providing additional benefits to the customer or user associated with the communication device 44. In either event and independent of other content of the webpage 43, a comparison as at 66' of the embedded icon code 33 with the displayed icon code 18 will be determinative of the authenticity of the product 12, as at 70.

The versatility of the system and method 10 of the present invention is further demonstrated by the ability to authenticate any given product 12 along substantially the entire chain of distribution. By way of example, any entity along the distribution chain such as, but not limited to, from the manufacturer to the ultimate or final retailer/distributor, may communicate with the processor facility 20 using an appropriate communication device. In this embodiment the communication device preferably includes "scanning capabilities" allowing the entity to optically read or scan the second displayed companion code 17, which is preferably in the form of a bar code. The receipt by the processor facility 20 of the transmitted second displayed code 17 will serve to "identify" the product 12 being reviewed, its location along the distribution chain and the corresponding correct code assembly 24, as set forth above. In this situation and as also set forth above, the second displayed code 17 will represent the "identifying" code allowing the processor facility 20 to access the data base 22 and locate the corresponding, accurate correct companion code assembly 24. In addition, the transmission of the second displayed code 17 from any entity along the distribution chain will inform the processor facility 20 as to the location of the product and its stage or station along the distribution chain. Therefore, the data base 22 in addition to storing a plurality of correct companion code assemblies 24-28 may also include a calendar or time based storage segment indicating the location of the product 12 along the distribution chain. Therefore, receipt of the second displayed companion code 17 from an inappropriate entity or inaccurate location relative to the distribution chain will indicate to the processor facility 20 that the product 12 is more than likely counterfeit. Also, repeated inquiries from any entity along the distribution chain will provide a further indication as to the product 12 being at either the correct or inappropriate stage or station along the distribution chain. The authenticity of the product 12 can thereby be further determined.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A system for determining product authenticity comprising:
   a displayed code assembly disposed on the product and comprising first, second and third displayed companion codes purportedly identifying the product,
   a communication device structured for input and transmission of a product identifying code over a predetermined communication network, said product identifying code defined by a selected one of said first or second displayed companion codes,
   a processor facility structured for bidirectional communication with said communication device and including a product database,
   said product database including a correct code assembly comprising first, second and third companion codes accurately associated with the product,
   said processor facility structured to access said correct companion code assembly and compare said product identifying code with said first or second correct companion code having a corresponding format as said product identifying code, and
   said processor facility being operative, upon a matching comparison of said product identifying code with a corresponding one of said first or second correct companion codes, to transmit said third correct companion code to said communication device for comparison with said third displayed companion code, for a determination of product authenticity.

2. A system as recited in claim 1 wherein said communication device comprises a mobile, hand-held device structured for manual input of one of said first or second displayed companion codes defining said product identifying code.

3. A system as recited in claim 1 wherein said communication device is structured to include scanning capabilities.

4. A system as recited in claim 3 wherein said first or second displayed companion code, defining said product identifying code, transmitted by said communication device is structured for optical scanning.

5. A system as recited in claim 4 wherein said first or second displayed companion code, defining said product identifying code and transmitted by said communication device, comprises a bar code.

6. A system as recited in claim 4 wherein said communication device comprises a mobile, hand-held device structured for manual input or optical scanning of said first or second displayed companion code defining said product identifying code.

7. A system as recited in claim 1 wherein said first, second and third displayed companion codes comprise different formats, said different formats comprising an alpha/numeric format, an optical scanning format and an icon format.

8. A system as recited in claim 1 wherein each of said first, second and third correct companion codes comprises a different format, said first, second and third correct companion codes each having a corresponding format as said first, second and third displayed companion codes respectively.

9. A system as recited in claim 8 wherein said first, second and third correct companion codes respectfully comprise an alpha/numeric format, an optical scanning format, and an icon format.

10. A system as recited in claim 1 wherein said communication device comprises GPS capabilities determinative of a location of the product; said product location communicable to said processor facility.

11. A system as recited in claim 1 wherein said processor facility is remote from a location of the product and said communication device; said processor facility further structured to transmit associated media to said communication device.

12. A system as recited in claim 11 wherein said communication device is structured to display said associated media; said associated media including said third correct companion code transmitted from said processor facility to said communication device and used for comparison with said third displayed companion code and determination of product authenticity.

13. A system as recited in claim 12 wherein said associated media includes said third correct companion code embedded therein and having a corresponding format as said third displayed companion code.

14. A system as recited in claim 11 wherein said associated media further includes an award program.

15. A system as recited in claim 11 wherein said associated media further includes an alert program.

16. A system as recited in claim 11 wherein said associated media comprises a web page associated with the product.

17. A system for determining product authenticity comprising:
   a displayed code assembly displayed on the product and including at least a first, second and third displayed companion codes, both of said first and second displayed companion codes purportedly identifying the product,
   a communication device structured for input of a product identifying code defined by either one of said first or second displayed companion codes and a transmission of said product identifying code over a communication network,
   a processor facility remote from a location of said product and structured for bidirectional communication with said communication device,
   a product database accessible by said processor facility and including a correct companion code assembly comprising first, second and third correct companion codes accurately associated with an authentic product,
   said first, second and third companion codes each having a corresponding format as said first, second and third displayed companion codes respectively,
   said processor facility structured to access said data base assembly and said first, second and third correct companion codes,
   said processor facility operative to transmit said third correct companion code to said communication device for comparison with said third displayed companion code for a determination of product authenticity, upon a matching comparison of said identifying code with a corresponding one of said first or second correct companion codes, and
   said product authenticity determined by a comparison of said third correct companion code transmitted by said processor facility to said communication device with said third displayed companion code.

18. A system as recited in claim 17 wherein said first, second and third displayed companion codes respectively comprise an alpha/numeric format, an optical scanning format and an icon format.

19. A system as recited in claim 18 wherein said first, second and third correct companion codes respectively comprise an alpha/numeric format, an optical scanning format and an icon format.

20. A system as recited in claim 17 wherein said processor facility is remote from a location of said product and said communication device; said processor facility further structured to transmit associated media to said communication device.

21. A system as recited in claim 20 wherein said associated media includes said third correct companion code transmitted from said processor facility to said communication device and used for comparison with said third displayed companion code for determination of product authenticity.

22. A system as recited in claim 20 wherein said communication device comprises a display structured to view said associated media, said associated media comprising a web page.

23. A method for determining product authenticity comprising:

selecting and transmitting either a first or second displayed companion code of a plurality of displayed companion codes appearing on the product to a processor facility, using a personnel communication device, storing a correct companion code assembly, comprising first, second and third correct companion codes which is unique to the product within the processor facility, comparing the first or second displayed companion code with the first or second correct companion code having a common format, selecting and transmitting, to the personal communication device, the third correct companion code associated with the correct companion code assembly unique to the product, visually comparing the third correct companion code received from the processor facility with a third one of the plurality of displayed companion codes appearing on the product which has a common format as the third correct companion code, and determining product authenticity by a match or non-match of the third correct companion code with the third displayed companion code having the common format.

* * * * *